United States Patent [19]
Khan et al.

[11] Patent Number: 5,624,293
[45] Date of Patent: *Apr. 29, 1997

[54] GAS DISCHARGE LAMPS AND LASERS FABRICATED BY MICROMACHINING METHODOLOGY

[75] Inventors: Babar A. Khan, Ossining; David A. Cammack, Scarborough; Ronald D. Pinker, Peekskill; Nikhil R. Taskar, Ossining, all of N.Y.

[73] Assignee: Philips Electronics North America Corporation, New York, N.Y.

[ * ] Notice: The term of this patent shall not extend beyond the expiration date of Pat. No. 5,483,343.

[21] Appl. No.: 470,903

[22] Filed: Jun. 6, 1995

Related U.S. Application Data

[62] Division of Ser. No. 484,256, Oct. 27, 1994, which is a continuation of Ser. No. 922,707, Jul. 28, 1992, abandoned.

[51] Int. Cl.$^6$ ............................. H01J 9/26; H01S 3/032
[52] U.S. Cl. ............................. 445/25; 445/28; 445/44
[58] Field of Search ............................. 445/24, 25, 28, 445/44

[56] References Cited

U.S. PATENT DOCUMENTS

| | | | |
|---|---|---|---|
| 3,639,804 | 2/1972 | Hernquist | 313/616 |
| 3,755,027 | 8/1973 | Gilsing | 445/24 X |
| 3,788,722 | 1/1974 | Milgram | 445/25 |
| 4,023,876 | 5/1977 | Fukunaga et al. | 445/25 |
| 4,182,540 | 1/1980 | Frankland et al. | 445/25 |
| 4,307,315 | 12/1981 | Meulemans et al. | 313/44 |
| 4,978,888 | 12/1990 | Hnandan et al. | 313/493 X |
| 4,990,826 | 2/1991 | Cocks et al. | 313/485 |
| 5,150,965 | 9/1992 | Fox | 313/493 |
| 5,233,262 | 8/1993 | Lynn et al. | 313/493 |
| 5,438,343 | 8/1995 | Khan et al. | 445/44 X |

FOREIGN PATENT DOCUMENTS

| | | |
|---|---|---|
| 0302748 | 2/1989 | European Pat. Off. |
| 0467542 | 1/1992 | European Pat. Off. |
| WO8704562 | 7/1987 | WIPO |
| WO9009676 | 8/1990 | WIPO |

*Primary Examiner*—Kenneth J. Ramsey
*Attorney, Agent, or Firm*—Michael E. Schmitt

[57] ABSTRACT

A high pressure gas discharge lamp and the method of making same utilizing integrated circuit fabrication techniques. The lamp is manufactured from heat and pressure resistant planar substrates in which cavities are etched, by integrated circuit manufacturing techniques, so as to provide a cavity forming the gas discharge tube. Electrodes are deposited in the cavity. The cavity is filled with gas discharge materials such as mercury vapor, sodium vapor or metal halide. The substrates are bonded together and channels may be etched in the substrate so as to provide a means for connection to the electrodes. Electrodeless RF activated lamps may also be fabricated by this technique. Micro-lasers may also be fabricated by this technique as well.

21 Claims, 3 Drawing Sheets

GAS DISCHARGE LAMPS AND LASERS FABRICATED BY MICROMACHINING METHODOLOGY

This is a division of application Ser. No. 08/484,256, filed on Oct. 27, 1994, which is a continuation of Ser. No. 07/922,707, filed Jul. 28, 1992 now abandoned.

BACKGROUND AND SUMMARY OF THE INVENTION

This invention is directed to high or low pressure gas discharge lamps used for lighting and display. This invention is also directed to a method of fabricating such lamps by integrated circuit fabrication techniques.

Gas discharge lamps (mercury vapor, sodium vapor, metal halide) are an important segment of the lighting industry. It is well known that the luminous efficiency of gas discharge bulbs increases substantially at high pressures (1–200 atmospheres). However, the containment of such high pressures in a transparent vessel has presented significant problems. Gas pressure is restricted in many instances because of the difficulty of finding materials that are sufficiently lightweight, while at the same time capable of withstanding high heat and pressures. Furthermore, such materials, to be practicable, must be capable of relatively inexpensive mass production. The usual construction of gas discharge lamps is to suspend a transparent pressure and heat resistant discharge tube by means of a metal framework within an outer glass bulb.

The present invention provides an entirely new paradigm for the construction of high pressure gas discharge lamps. Rather than an discharge tube mechanically suspended within an outer bulb, the present invention is directed towards methods of fabricating high pressure "microlamps" utilizing micromachining techniques which are similar to integrated circuit fabrication techniques such as the etching of and bonding of planar substrates. The present invention is directed to an improved gas discharge lamp that can withstand very high pressures and the method of making such a lamp by means of integrated circuit manufacturing techniques. The lamp is manufactured from two planar sheets of temperature and pressure resistant transparent material. A cavity is etched in one or both of the sheets and electrodes are therefore deposited in the cavity. The cavity is charged with a filler appropriate to the type of lamp being manufactured such as mercury, sodium or metal halides. The two sheens are then bonded together so as to seal the cavity within the sheets. Contact may then be made with the electrodes to activate the lamp. Electrodeless lamps activated by radio frequency energy may also be manufactured by this technique. Miniature gas discharge lasers may also be produced by this technique.

BRIEF DESCRIPTION OF THE DRAWINGS

For better understanding of the invention, reference is made to the following drawings which are to be taken in conjunction with the detailed description to follow.

DETAILED DESCRIPTION OF THE PREFERRED EMBODIMENT

Figure 1:
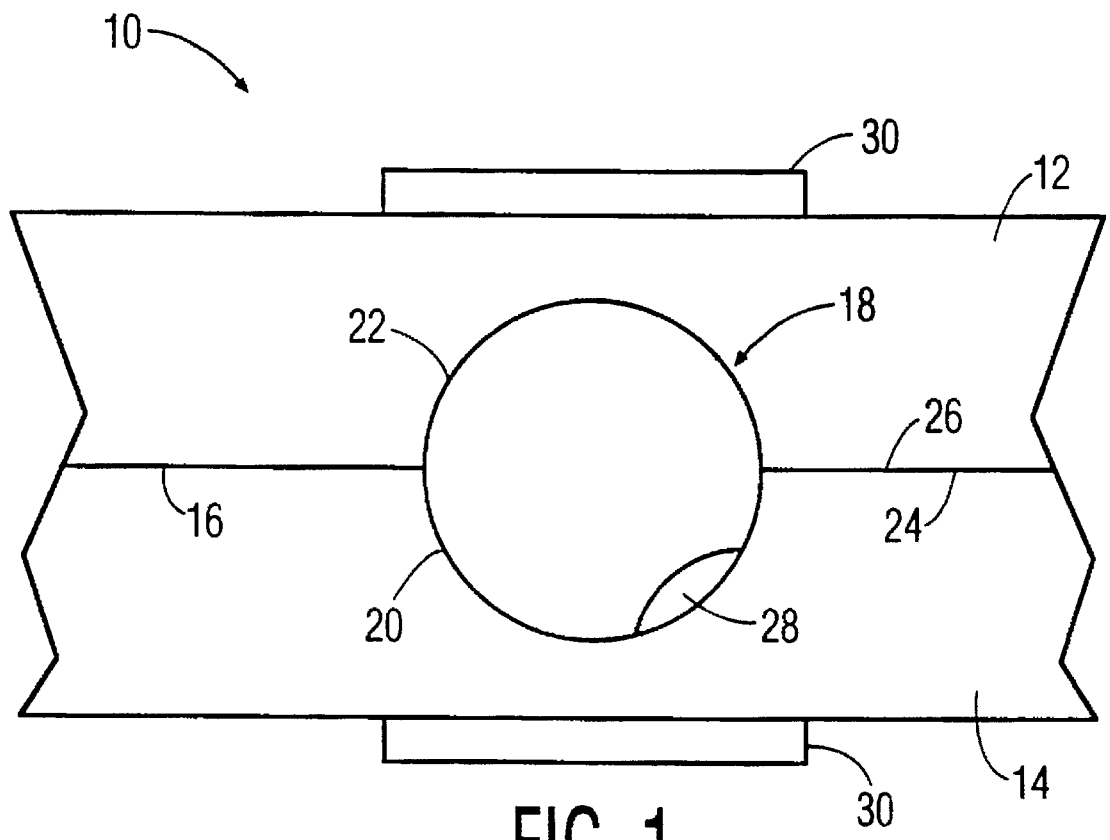
FIG. 1 is a sectional diagram of an electrodeless, radio frequency activated lamp constructed in accordance with the present invention.
Figure 2:
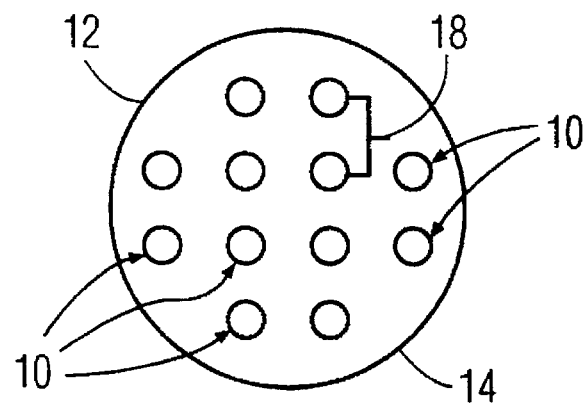
FIG. 2 is a plan view of the transparent substrates having a plurality of lamp cavities disposed therein.

FIGS. 1 and 2 illustrate a high pressure lamps fabricated in accordance with the present invention. As shown in FIGS. 1 and 2, a lamp 10 is fabricated from a first planar substrate 12 and a second planar substrate 14 which are bonded together by suitable means, as described below, and each lamp 10 comprises a plurality of cavities 18 which form individual luminescent micro-lamps. In FIGS. 1 and 2, the cavities 18 are depicted as generally spherical and the substrates 12 and 14 are depicted as circular in plan view. It should be kept in mind that the cavities and substrates may be of any size and shape. The substitutes are depicted as circular since handling equipment for circular plates is readily available from numbers of integrated circuit manufacturing equipment. Cavities 18 may be square, rectangular or elongated channels.

FIG. 1 illustrates a lamp constructed in accordance with the present invention in its simplest embodiment, that of an electrodeless RF activated lamp. The steps of manufacturing the lamp will also be discerned from this figure. Planar substrate 14 is transparent and consists of material suitable for containing the pressure and temperature of an operating lamp, one such suitable material is quartz. Cavity 18 which comprises a half cavity 20 in substrate 14 and a half cavity 22 in substrate 12 is formed by integrated circuit manufacturing techniques.

The upper surface 24 of un-etched substrate 14 is covered by suitable masking material, such as polysilicon, at the portions where etching is not desired, as etching will occur at the unmasked portions. Thereafter, the masked substrate is exposed to an etchant such as hydrofluoric acid for a time suitable to create cavity 20. The time and amount of exposure to the etchant may be adjusted, in the known manner, to provide the cavity size and shape desired. Upper substrate 12 is therefore masked and etched in a similar manner to provide half cavity 22. For certain bonding processes, it is desirable that the surfaces of substrates 12, 14 that are to be bonded together be planarized. This can be accomplished by depositing phosphorus doped silicon dioxide and polishing the surface. Alternatively a smooth surface can be obtained by depositing phosphorous doped silicon dioxide and reflowing (heating) it.

After the formation of cavities 20 and 22 in substrates 12 and 14, respectively, cavity 20 is charged with a suitable luminescent material. In this embodiment, the lamp is a mercury lamp so that an appropriate sized drop of mercury 28 is placed in cavity 20. If cavity 18 is to be charged with a gas such as Argon, the bonding of substrates 12, 14 may take place in an argon atmosphere at a pressure suitable for the final lamp. Accordingly, substrates 12 and 14 are placed in a pressure vessel at the appropriate argon pressure for the lamp to be manufactured. Thereafter, lower surface 26 of substrate 12 is bonded to upper surface 24 of substrate 14. The bonding interface 16 may be formed by any suitable means such as heat, chemical or anodic bonding. After the bonding is completed, the completed lamp 10 is removed from the pressure vessel and cavity 18 will contain an argon atmosphere having a charge of mercury that will vaporize and form a mercury vapor lamp upon energization. Since this is an "electrodeless lamp", the mercury is vaporized and luminesces by application of RF energy from external RF electrodes 30.

Figure 3:
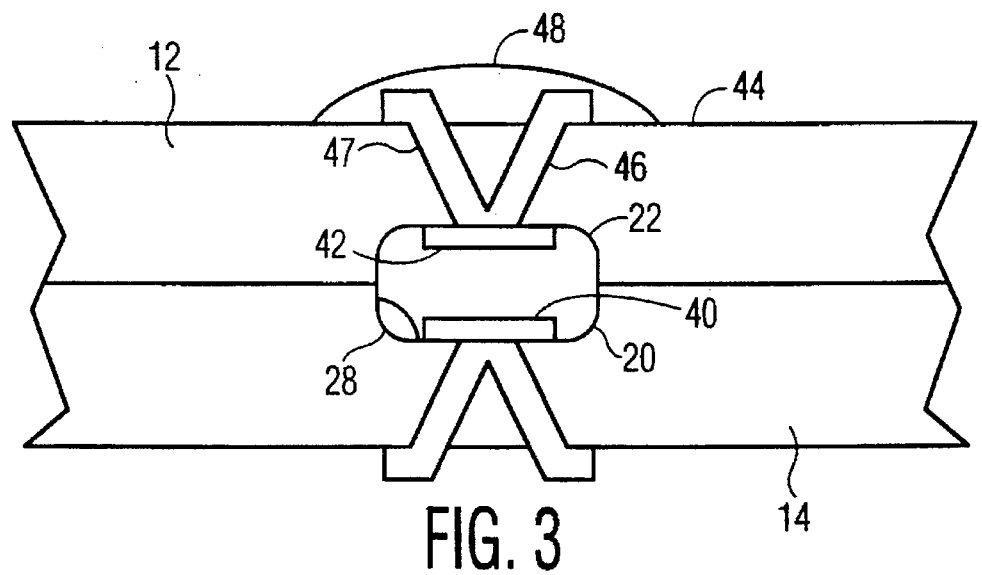
FIG. 3 is a sectional view of a lamp having opposed electrodes manufactured in accordance with the present invention.

FIG. 3 illustrates how the present invention is used to produce a lamp having electrodes which is a more common design than the RF lamp of FIG. 1. In FIG. 3, the same reference numerals are used to indicate the same structure that of FIG. 1. In FIG. 3, each half cavity 20, 22 in substrates 14, 12 is produced by masking and etching in a similar manner as the lamp of FIG. 1. After the etching of the half cavities 20, 22 a further manufacturing step takes place: the deposition of electrodes 40 and 42 in cavities 20, 22 respectively. The electrodes may be composed of any suitable electrode material, such as tungsten, and are deposited by known metal deposition processes, i.e. masking, etching and deposition of material. Since electrodes 40, 42 must be connected to current, electrical connection must be made to electrodes 40, 42. Connection with electrode 42 is made by etching a channel 46 in the upper surface 44 of substrate 12. In this case, upper surface 44 is masked at the areas to remain unetched and an enchant acts on the unmasked portions to etch channel 46 into surface 44 down to the electrode 42 to expose its rear surface. Thereafter, by deposition and patterning, a conductive layer 47 is applied in channel 46. The conductive layer 47 comprises conductive material that may be a metallic or non-metallic conductor, and extends from the electrode 40, 42 to the outer surface of the respective substrates. In order to maintain the pressure integrity of cavity 18, "plug" material 48 such as glass is deposited over the conductive layer 47 to strengthen cavity 18 and to render the outer substrate surfaces flush. Thereafter, substrates 12, 14 are charged with the appropriate luminescent material and bonded as is described above with respect to the lamp of FIG. 3. Connection of electrodes 40, 42 to an appropriate source of current will cause the lamp to illuminate. Additional pairs of electrodes, such as starter electrodes, may also be deposited and connected in a like manner.

Figure 4:
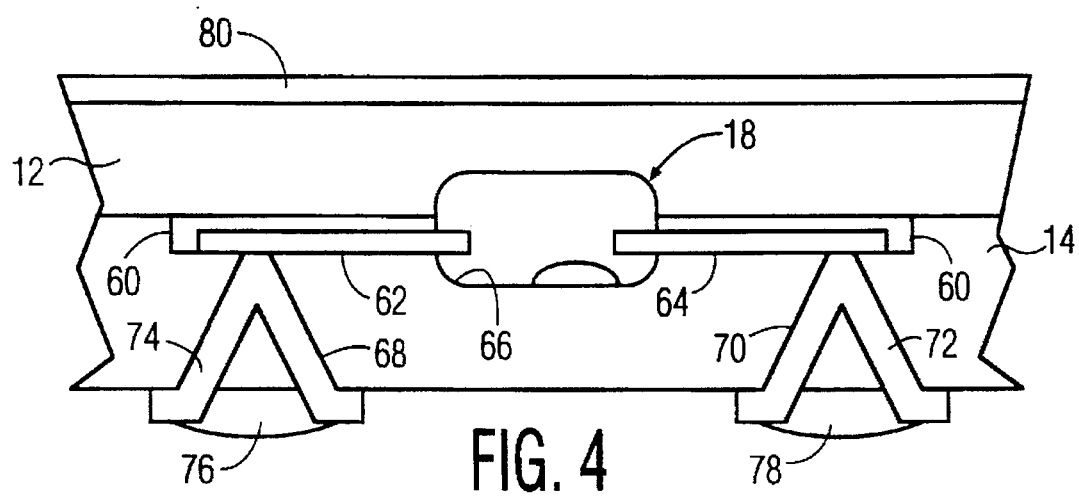
FIG. 4 is a sectional view of a side electrode lamp manufactured in accordance with the present invention.

FIG. 4 illustrates another embodiment of the present invention in which the electrodes are disposed in side-by-side relationship, the same reference numerals are again used to denote similar structure. As shown in FIG. 4, the upper substrate 12 is formed in a similar manner to the previous embodiments. However, lower substrate 14 is first masked and etched so as to form a relatively wide rectangular cavity 60 and electrodes 62, 64 are deposited on its flat lower surface. A second deeper central cavity 66 is then etched into substrate 14 by suitable masking and etching techniques, and by use of an etchant which does not attack the material of electrodes, 62, 64. These electrodes will overhang cavity 66. Thereafter, the lower surface of substrate 14 is etched to create channels 68, 70 which contact the lower surface of electrodes 62, 64 respectively. A conductive layer 72, 74 may then be deposited in channel 70, 68 for electrical connection to electrode 64, 62. Thereafter, plug material 76, 78 may be used to fill in the gap between the lower surface of substrate 14 and conductive layers 72, 74. The cavity 18 is then charged. The lower surface of substrate 12 is then bonded to substrate 14 in the manner described above.

The present structure and methodology also lends itself to the manufacture of miniature fluorescent bulbs which utilize a phosphor coating which, when energized by the ultraviolet rays generated by mercury vapor, will fluoresce. In FIG. 4, the phosphor layer 80 is deposited on the upper surface of substrate 12. The lamp shown in FIG. 4 has both electrodes disposed in a single substrate and the electrical connections are made on a single substrate. It is also noted that in the construction of this type of lamp, there need not be a cavity 22 disposed in substrate 12 because if cavity 60 is large enough, upper substrate 12 may be merely a flat piece of quartz or glass.

Figure 5:
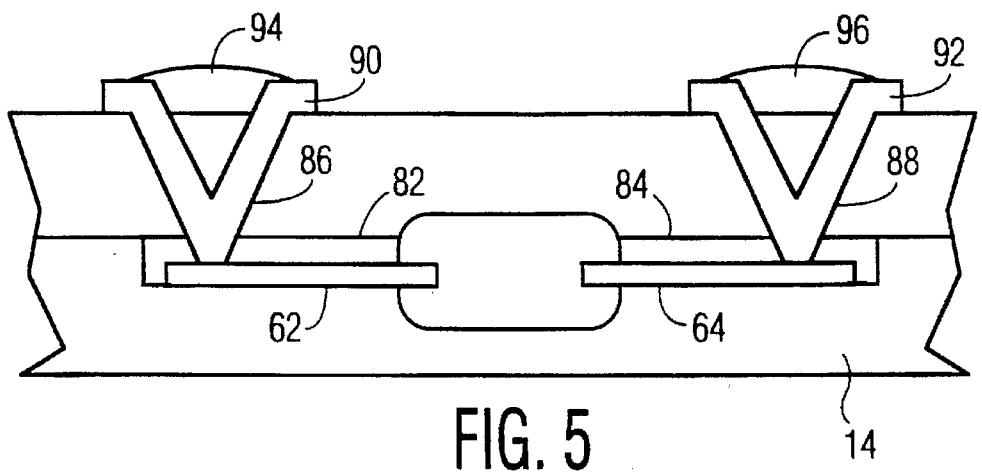
FIG. 5 is a sectional view of a further embodiment of a side electrode lamp constructed in accordance with the present invention.

FIG. 5 shows yet another variant of the side electrode lamp of FIG. 4. In the lamp shown in FIG. 5, the lower substrate 14 further includes deposition of layers 82, 84 of P-glass (phosphorus doped glass) which cover electrodes 62 64- to a level equal to the upper surface of substrate 14. Thereafter, the upper substrate 12 has channels 86, 88 etched through substrate 12 and through the P-glass layers 82, 84 so as to expose the upper surface of electrodes 62, 64. Thereafter, conductive layers 90, 92 and plug material 94, 96 are deposited in channels 86 and 88. This arrangement permits contact with and connection to electrodes 62, 64 through the upper surface of the device rather than the lower surface of the device as shown in FIG. 4. The use of P-glass also provides an efficient sealing of the electrodes to the substrate.

Figure 6:
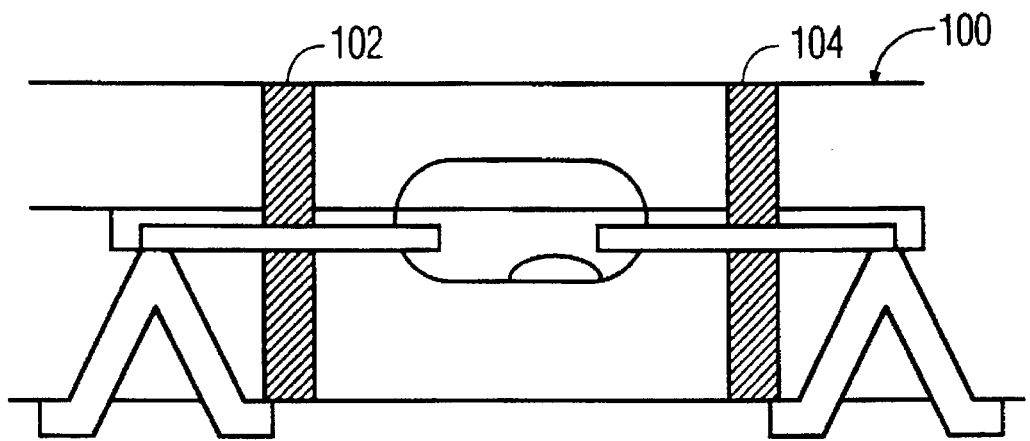
FIG. 6 is a sectional view of a side electrode lamp including melt zones to further seal the electrodes.

FIG. 6 illustrates a side electrode lamp 100 which is constructed similar to that of FIG. 4 with the addition of melt zones 102, 104 which are used to further seal the electrodes within the substrates. Melt zones 102, 104 are formed by exposing the completed lamp to a $CO_2$ laser which will melt the quartz substrates to seal the tungsten electrodes firmly therewithin. Additionally, a layer of molydenum may be added to the tungsten electrodes to aid in sealing. The molydenum layer will assist the substrate/electrode seal with or without melt zones 102, 104.

As noted above, lamps fabricated by this methodology may be any type of gas discharge lamp. The material suitable for the substrates is also not required to be quartz as any transparent material capable of withstanding the heat and pressure that may be used. In certain circumstances, glass is a suitable substrate for use with the certain types of lamps. The number of cavities disposed in the substrate may be varied in accordance with the requirements of the application. The lamps may be used as illumination or as display. Finally, the lamps can be energized all at once or circuitry can be disposed on the substrate so as to provide non-simultaneous activation of the various microlamps disclosed in the substrate.

Figure 7:
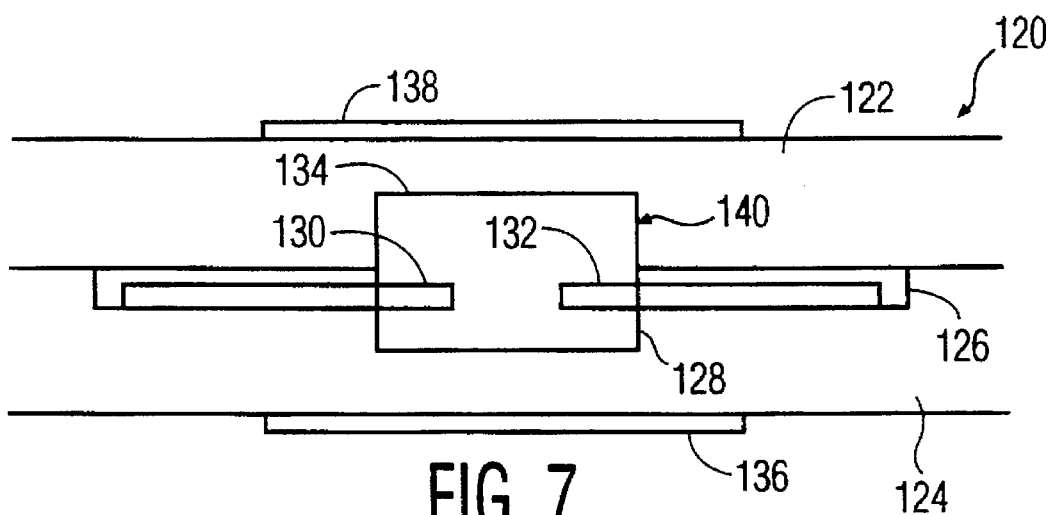
FIGS. 7 and 8 are sectional views of micro-lasers constructed in accordance with the invention.

FIG. 7 illustrates a micro-laser constructed in accordance with the invention. Micro-laser 120 is constructed, as are the previous gas discharge lamps, from an upper substrate 122 and a lower substrate 124. Lower substrate 124 has a first, relatively shallow channel 126 disposed thereon and a second deeper channel 128 at its centermost portion. By etching and deposition techniques similar or identical to those described above extending into channel 128 are first and second electrodes 130, 132. Similarly upper substrate 122 has a channel 134 formed therein. Mounted to the exterior of substrate 124 is a partially reflective mirror 136 formed by metal deposition, photlithographic techniques and etching. Disposed on the upper substrate 122 is a fully reflective mirror 138. A central cavity 140 is formed by the half cavities 128, 134 and may be charged with gaseous material which will lase under application of electrical input applied on electrodes 132, 130.

When a discharge is created within cavity 140 the action of mirrors 136 and 138 will provide a lasing action such as to cause the atoms of the gaseous material to lase as is known to those skilled in the art of gas discharge lasers. Thus, partially reflective mirror 136 and fully reflective mirror 138 form an optical cavity for the excitation of atoms of the gaseous fill material. Suitable gaseous fill material are those usually utilized in large size gas discharge lasers.

Such material includes $CO_2$, Helium-Neon, Argon and the like. By suitable selection of the gaseous material and by the size and properties of the optical cavity, the lasing frequency may be adjusted over a wide frequency range. Such frequencies can range from the infrared to the ultraviolet. Gas discharge lasers are capable of generating light of a blue frequency or higher which, at this date, are difficult for solid state devices. Micro-lasers constructed in accordance with this invention can also be "electrodeless". Such lasers can be pumped through the application of external RF or microwave energy.

Figure 8:
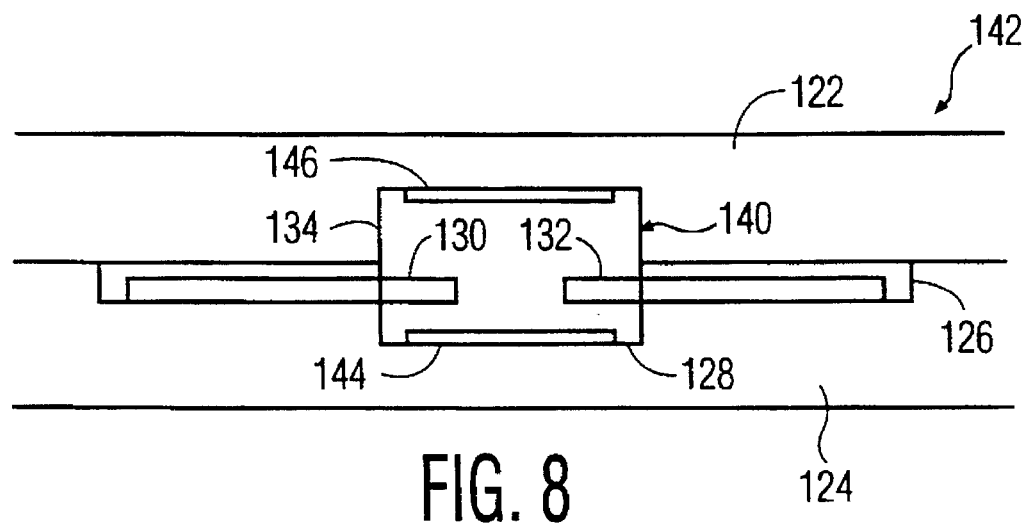

FIG. 8 shows another embodiment of a micro-laser constructed in accordance with the present invention. In FIG. 8 the same reference numerals are used to indicate the same structure as that of FIG. 7. In the laser structure of FIG. 7, mirrors 136 and 138 were disposed external to the substrates. The present invention does not require that the mirrors be disposed externally of the optical cavity. FIG. 8 illustrates a laser structure including mirrors disposed in cavity 140. In FIG. 8 a partially reflective mirror 144 is disposed on the lower surface of cavity 128 in lower substrate 124. A fully reflective mirror 146 is disposed on the upper surface of cavity 134 in upper substrate 122. The mirrors used in the structures of FIG. 7 and FIG. 8 may also be constructed from metallic materials which may be deposited within the substrates. It is to be further noted that the mirrors utilized in construction with the micro-lasers of FIG. 7 and FIG. 8 need not have planar surfaces. The mirror surfaces could be curved in accordance with any special requirements. Furthermore the mirrors can be spaced apart from the substrates and need not be mounted thereto. A particularly suitable substrate material for use in a laser device is sapphire. Since sapphire is crystalline anisotropic etching can provide mirrors with superior optical qualities.

The above described structures and methodology are merely illustrative of the principles of the present invention. Numerous modifications and adaptations thereof will be readily apparent to those skilled in the art without departing from the spirit and scope of the present invention and the appended claims.

What is claimed is:

1. A method for fabricating a gas discharge lamp comprising the steps of:
    a) providing a first and second substrate of transparent material capable of withstanding heat and pressure;
    b) etching a lamp cavity in at least one of said substrates;
    c) charging the lamp cavity with gas discharge material that luminesces when activated; and
    d) wafer bonding said first and second substrates together so as to seal said lamp cavity.

2. The method as claimed in claim 1, further comprising the step of depositing an electrode in at least one of said lamp cavities before said lamp cavity is charged and said substrates are wafer bonded.

3. A method for fabricating a gas discharge lamp comprising the steps of:
    a) providing a first and second substrate of transparent material capable of withstanding heat and pressure;
    b) etching a cavity in at least one of said substrates;
    c) charging the cavity with gas discharge material that luminesces when activated;
    d) wafer bonding said first and second substrates together so as to seal said cavity;
    e) depositing an electrode in at least one of said cavities before said cavity is charged and said substrates are wafer bonded; and
    f) etching a channel into an outer surface at said substrate containing said electrode so as to expose a surface of said electrode.

4. The method as claimed in claim 3, further including the step of depositing a conductive layer into said channel in said substrate to form an electrical contact with said electrode.

5. The method as claimed in claim 4, further including the step of filling the channel in the outer surface with material so as to maintain pressure integrity of the cavity.

6. The method of claim 1, further comprising the step of:
    e) depositing an external electrode outside said lamp cavity.

7. The method of claim 6, wherein said depositing step comprises, for at least one of said substrates having said lamp cavities, depositing said external electrode on an outer surface of said substrate opposite said lamp cavity.

8. The method of claim 1, further comprising the step of:
    e) etching an electrode cavity in an inner surface of at least one of said substrates.

9. The method of claim 8, wherein the step of etching an electrode cavity precedes the step of etching a lamp cavity.

10. The method of claim 8, further comprising the step of depositing electrode material in said electrode cavity.

11. The method of claim 10, wherein the step of depositing electrode material precedes the step of etching a lamp cavity and the step of etching a lamp cavity comprises etching said lamp cavity deeper into said substrate than said electrode cavity and so that said lamp cavity is disposed relative to said electrode cavity so as to provide an electrode that overhangs said lamp cavity.

12. The method of claim 10, further comprising the step of depositing a fill layer over said electrode material in said electrode cavity.

13. The method of claim 10, further comprising the step of etching a channel into an outer surface of at least one of said substrates so as to expose a surface of said electrode material in said electrode cavity.

14. The method of claim 13, further comprising the step of depositing a conductive layer into said channel for electrical connection to said electrode material.

15. The method of claim 14, further comprising the step of filling between the channel and the conductive layer.

16. The method of claim 10, further comprising the step of providing a melt zone to seal the electrode cavity relative to said substrates and soil electrode material.

17. The method of claim 16, further comprising the step of providing a layer of molybdenum on the electrode material prior to providing the melt zone.

18. The method of claim 10, further comprising the step of providing a layer of molybdenum on the electrode material.

19. The method of claim 1, wherein the step b comprises etching in a single batch process step a plurality of lamp cavities into at least one of said substrates, step c comprises charging a plurality of lamp cavities in a single batch process step and, subsequent to wafer bonding in step d, the method further comprises the step of separating said plurality of lamp cavities to form a plurality of gas discharge lamps, each of said lamps comprising at least one lamp cavity.

20. The method of claim 1, wherein the step of charging the lamp cavity is achieved by performing the step of wafer bonding the substrates in an atmosphere including at least one component of said gas discharge material, said atmosphere having a pressure suitable for the gas discharge lamp being fabricated.

21. The method of claim 1, further comprising the step of providing a phosphor coating on an outer surface of at least one of said substrates.

* * * * *